(12) United States Patent
Di Monte

(10) Patent No.: US 11,674,608 B2
(45) Date of Patent: Jun. 13, 2023

(54) DUAL AIR ADMITTANCE VALVE WITH LOCKING MECHANISM AND PRESSURE INDICATOR

(71) Applicant: Michael Anthony Di Monte, Howell, NJ (US)

(72) Inventor: Michael Anthony Di Monte, Howell, NJ (US)

( * ) Notice: Subject to any disclaimer, the term of this patent is extended or adjusted under 35 U.S.C. 154(b) by 0 days.

(21) Appl. No.: 17/330,056

(22) Filed: May 25, 2021

(65) Prior Publication Data
US 2021/0348692 A1 Nov. 11, 2021

Related U.S. Application Data

(63) Continuation of application No. 16/734,339, filed on Jan. 5, 2020, now abandoned, which is a continuation of application No. 15/788,829, filed on Oct. 20, 2017, now Pat. No. 10,557,557, which is a continuation-in-part of application No. 15/675,818, filed on Aug. 14, 2017, now Pat. No. 10,655,739, and a continuation-in-part of application No. 15/299,446, filed on Oct. 20, 2016, now abandoned, which is a continuation-in-part of application No. 15/293,315, filed on Oct. 14, 2016, now Pat. No. 9,657,468, which is a continuation-in-part of application No. 15/275,419, filed on Sep. 25, 2016, now Pat. No.
(Continued)

(51) Int. Cl.
*F16K 15/02* (2006.01)
*E03C 1/122* (2006.01)
*F16K 25/00* (2006.01)
*F16K 15/03* (2006.01)
*F16K 15/04* (2006.01)
*E03F 5/08* (2006.01)

(52) U.S. Cl.
CPC .......... *F16K 15/028* (2013.01); *E03C 1/1225* (2013.01); *F16K 15/035* (2013.01); *F16K 15/04* (2013.01); *F16K 25/00* (2013.01); *E03F 5/08* (2013.01)

(58) Field of Classification Search
CPC ............................. F16K 15/028; F16K 15/02
See application file for complete search history.

(56) References Cited

U.S. PATENT DOCUMENTS 2,444,182 A * 6/1948 Calvin ................. F16K 15/042
137/613
4,139,469 A * 2/1979 Rainin ................. F16K 15/042
210/136
(Continued)

*Primary Examiner* — Reinaldo Sanchez-Medina

(57) ABSTRACT

An apparatus to allow or stop an air flow into an enclosed environment or piping system comprises (a) a housing, (b) a first valve seat, (c) a first sealing member, (d) a second valve seat, (e) a second sealing member, (f) at least one locking mechanism configured to limit a movement of the first sealing member and/or the second sealing member; wherein the first sealing member moves away from the first valve seat when the second pressure is greater than the first pressure in a predetermined pressure difference; wherein the second sealing member moves away from the first valve seat when the third pressure is greater than the second pressure in a predetermined pressure difference; wherein the first pressure communicates with a system pressure in the piping system; and wherein the third pressure communicates with an ambient air pressure.

19 Claims, 18 Drawing Sheets

Related U.S. Application Data

10,030,372, which is a continuation-in-part of application No. 15/246,464, filed on Aug. 24, 2016, now Pat. No. 9,926,691, which is a continuation-in-part of application No. 15/132,131, filed on Apr. 18, 2016, now Pat. No. 9,797,120.

(56) References Cited

U.S. PATENT DOCUMENTS

| | | | |
|---|---|---|---|
| 9,657,468 B1 * | 5/2017 | Di Monte, Sr. | E03F 5/08 |
| 10,557,557 B2 * | 2/2020 | Di Monte | E03C 1/1225 |
| 10,914,057 B2 * | 2/2021 | Di Monte | G01L 7/166 |

* cited by examiner

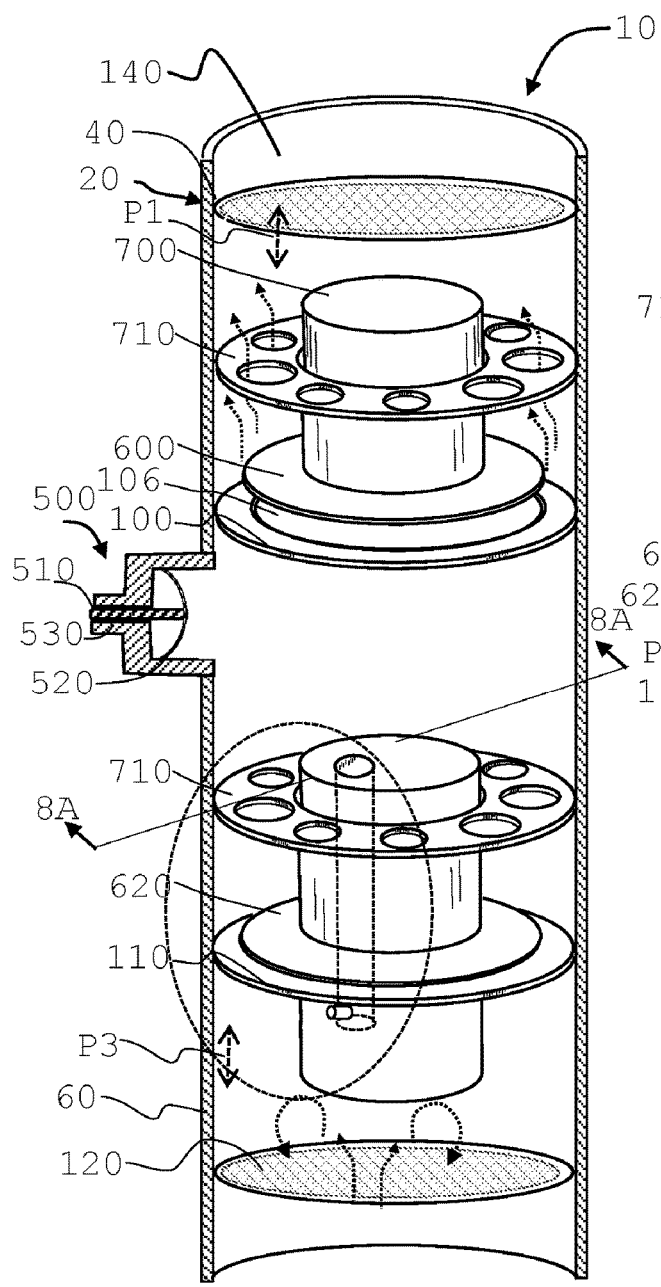
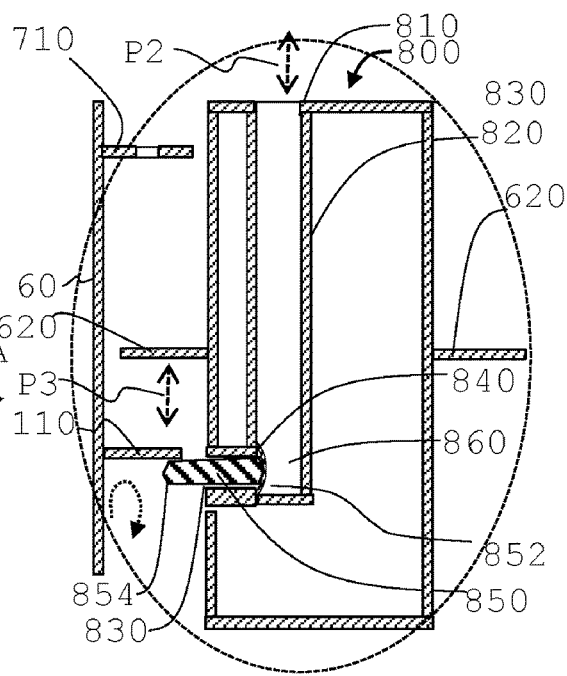
FIG. 8
FIG. 8A

DUAL AIR ADMITTANCE VALVE WITH LOCKING MECHANISM AND PRESSURE INDICATOR

CROSS-REFERENCE RELATED TO RELATED APPLICATIONS

This application is a continuation-in-part application claiming the benefit and priority of U.S. Nonprovisional patent application Ser. No. 15/675,818, filed Aug. 14, 2017, which claims the priority and benefit of US the following provisional patent applications, which are incorporated by reference: No. U.S. Provisional Application No. 62/538,499, filed Jul. 28, 2017; U.S. Provisional Application No. 62/538,701 filed Jul. 30, 2017; and U.S. Provisional Application No. 62/540,705 filed Aug. 3, 2017. This application is also a continuation-in-part application claiming the priority and benefit of U.S. Nonprovisional patent application Ser. No. 15/299,446, filed Oct. 20, 2016, which is incorporated herein by reference in its entirety. The Nonprovisional patent application Ser. No. 15/299,446 application is also a continuation-in-part application claiming the priority and benefit of U.S. Nonprovisional Patent Application No. 15,293,315, filed Oct. 14, 2016, which is incorporated herein by reference in its entirety. The Nonprovisional Patent Application No. 15,293,315 application is also a continuation-in-part claiming the priority and benefit of U.S. Nonprovisional Patent Application Nonprovisional Patent application Ser. No. 15/275,419, filed Sep. 25, 2016, which is incorporated herein by reference in its entirety. The application Ser. No. 15/275,419 is a continuation-in-part claiming the priority and benefit of U.S. Nonprovisional patent application Ser. No. 15/246,464, filed Aug. 24, 2016, which is incorporated herein by reference in its entirety. The Nonprovisional patent application Ser. No. 15/246,464 application is also a continuation-in-part claiming the priority and benefit of U.S. Nonprovisional patent application Ser. No. 15/132,131, filed Apr. 18, 2016, which is incorporated herein by reference in its entirety. U.S. Nonprovisional patent application Ser. No. 15/132,131 also claims the priority and benefit of US provisional patent application No. U.S. Provisional Application No. 62/151,463, filed Apr. 23, 2015.

BACKGROUND

A variety of air admittance valves have been made over the years for allowing air to enter a piping system or an enclosed environment under a negative or vacuum pressure, which is created when water is flowing down the drain for instance thus to preventing siphoning of traps or when a sump pump keeps pumping water and air out of an enclosed sump pit. Attaching an air admittance valve allows ambient air to enter the enclosed environment to eliminate negative pressure or vacuum in the enclosed system. Many of these products are specifically or only designed for systems such as piping systems and sewer systems where a local vent or air intake is not possible or due to the difficulty of running pipes through an already built home. Typically, these air admittance valves only provide specific operating conditions such as the vacuum pressure in the amount of air required. The air admittance valves available in the market today do not provide for an instantaneous and higher volume of air demand. And this causes a problem when existing air admittance components are installed on systems requiring the higher air flow demand. This problem causes strain on the air admittance component and cause it to fail prematurely in addition it causes it to operate against its own design because it was designed to work on a natural gravity air flow vacuum or negative pressure constraint. Also it is a problem that the air admittance valves not working at all or failing immediately when a high air flow demand is required. Furthermore, another problem is that air admittance components available do not filter the air and therefore can allow for corrosive environment to enter the system and damaging the Air admittance components.

There is also an undesired negative situation that the piping system will generate a negative pressure in the piping system when the flow is drained from the piping system. When negative pressure occurs, the water seals in the U-band or trap will be syphoned out and losses the function to prevent sewer gas to enter the house. Therefore, various air admittance valves have designed to allow air enter a piping system to prevent the negative pressure environment. However, regular air admittance valve is also easy to fail.

For these reasons are users are disappointed when there is no product available on the market that they can use for a higher volume demand in a negative pressure scenario such as an enclosed pit with a pump requiring air to enter the system at the same rate of which it is pumping the water out. For instance, a pump that can pump 20 gallons per minute and would require a large demand of air flow to enter the system so that a vacuum does not occur putting stress on the pump and causing the water discharge to not operate and discharge the water properly. In the case of a sump pump, the pump becomes air locked and runs continuous which causes the pump to overheat, burnout and/or fail causing the area to flood and cause water damage to the building.

In many cases it is also required that after air enters the system that there is a proper seal in place to provide a radon gas, water and airtight seal after the air has been allowed to enter the system and when the pump disengages. It is also required that if failure is to occur on such an air admittance component that it must fail in a closed/sealed position providing continued protection so that no air, water or radon gas can escape into the air within the building or within a certain high of the structures roof line on the exterior.

Although some check valves have the design of a ball inside the valve to stop or open the flow to pass through the valve. However, those ball valve tends to have accumulated scum or fouls on the ball that cause the ball not able to seal the flow properly.

Another issue currently in the market is that the detection of the leakage of the valve is not easy. Since the valve has one end connected to the ambient air and one end to the plumbing system or the enclosed environment, the pressure status detected is either the ambient environment's pressure or the plumbing system's pressure. Those two pressure cannot be used to detect whether the valve is leaked or not. Often the valve is worn out and the valve seat cannot seal the foul air very well. The leakage might be subtle. Therefore, it is hard to detect from the ambient air pressure or the pressure in the plumbing system, which varied in accordance to the flow movement in the plumbing system.

Another problem pertaining to thermal expansion of gasses and the relationship between temperature, volume, and pressure. The following example may illustrate this issue. The air outside and the air inside the building are a constant. So if, the air outside pressure is 1 atm (Atmospheric pressure) at 100° F., then the air inside pressure is 0.946 atm at 70° F. Therefore, the pressure differential is—0.054 atm at a the 30° F. temperature differential. Since the sealing member for ambient zone opening pressure is 0.001 atm the valve would leak foul gas into the ambient pressure zone with only −1° F. of temperature change from outside to inside.

Another issue also crucial to the current air admittance valve in the market is that there is no double assurance in single valve to ensure that failure of the valve can be made up by other mechanism. Often, the current practice is to install two check valves inline, which is problematic that this practice causes too much connecting spaces and extra works, and the losses of energy due to the energy losses in multiple connection entrances. Therefore, there is a long-felt need to resolve aforementioned issues.

BRIEF SUMMARY OF THE INVENTION

This Brief Summary is included so as to introduce, in an abbreviated form, various topics to be elaborated upon below in the Detailed Description. This Brief Summary is not intended to identify key or essential aspects of the claimed invention. This brief Summary is similarly not intended for use as an aid in determining the scope of the claims. The subject matters of this application overcomes the aforementioned problems and may be used as an apparatus to allow or stop an air flow into an enclosed environment or piping system comprises a housing having an upper flow passage, a middle flow passage, a lower flow passage, wherein the upper flow passage is above the middle flow passage, wherein the middle flow passage is above the lower flow passage, wherein a first pressure exists in the upper flow passage, wherein a second pressure exists in the middle flow passage, wherein a third pressure exists in the lower flow passage, wherein the upper flow passage; a first valve seat, wherein the first valve seat is between the upper flow passage and the middle flow passage, and wherein a at least one opening is formed on the first valve seat; (c) a first sealing member, wherein the first sealing member is configured and dimensioned to substantially cover the at least one opening of the first valve seat, wherein the first sealing member can move upwardly and downwardly above the first valve seat; (d) a second valve seat, wherein the second valve seat is between the middle flow passage and the lower flow passage, and wherein a at least one opening are formed on the second valve seat; and (e) a second sealing member, wherein the second sealing member is configured and dimensioned to substantially cover the at least one opening of the second valve seat, wherein the second sealing member can move upwardly and downwardly above the second valve seat; (f) at least one locking mechanism configured to limit a movement of the first sealing member and/or the second sealing member; wherein the first sealing member moves away from the first valve seat when the second pressure is greater than the first pressure in a predetermined pressure difference; wherein the second sealing member moves away from the first valve seat when the third pressure is greater than the second pressure in a predetermined pressure difference; wherein the first pressure communicates with a system pressure in the piping system; and wherein the third pressure communicates with an ambient air pressure.

When the piping system has radon gas, methane or other gas that generate positive pressure in the piping system or the enclosed environment the sealing members will stay in the closed position and prevents radon gas, methane or other gas from leaving the piping system or the enclosed environment. The invention provides the proper seal by the sealing members with the locking mechanism which has many advantage than the traditional flap valve. The current invention also resolves another two issues mentioned in the background: the leakage of the valve and the detection of the leakage. The dual design of the valve ensures the air admittance valve still able to seal the flow when one of the valve seat or the valve is failed. Also, the current invention also is able to create a positive, neutral, or negative pressure within the valve. The pressure status can be known and indicated by the invention. When the pressure status changes and is detected by the invention, the leakage of the valve will be detected.

BRIEF DESCRIPTION OF THE DRAWINGS

It should be understood that the drawings are merely representative, are not necessarily drawn to scale, and are not intended to limit the subject matter of this application.

FIG. 8 is a perspective view of one of the embodiments with pressure indicator and locked locking mechanism in the carrier.

FIG. 8A is a partially sectional view of one of the embodiments with pressure indicator and locked locking mechanism in the carrier.

DETAILED DESCRIPTION

Figure 1:
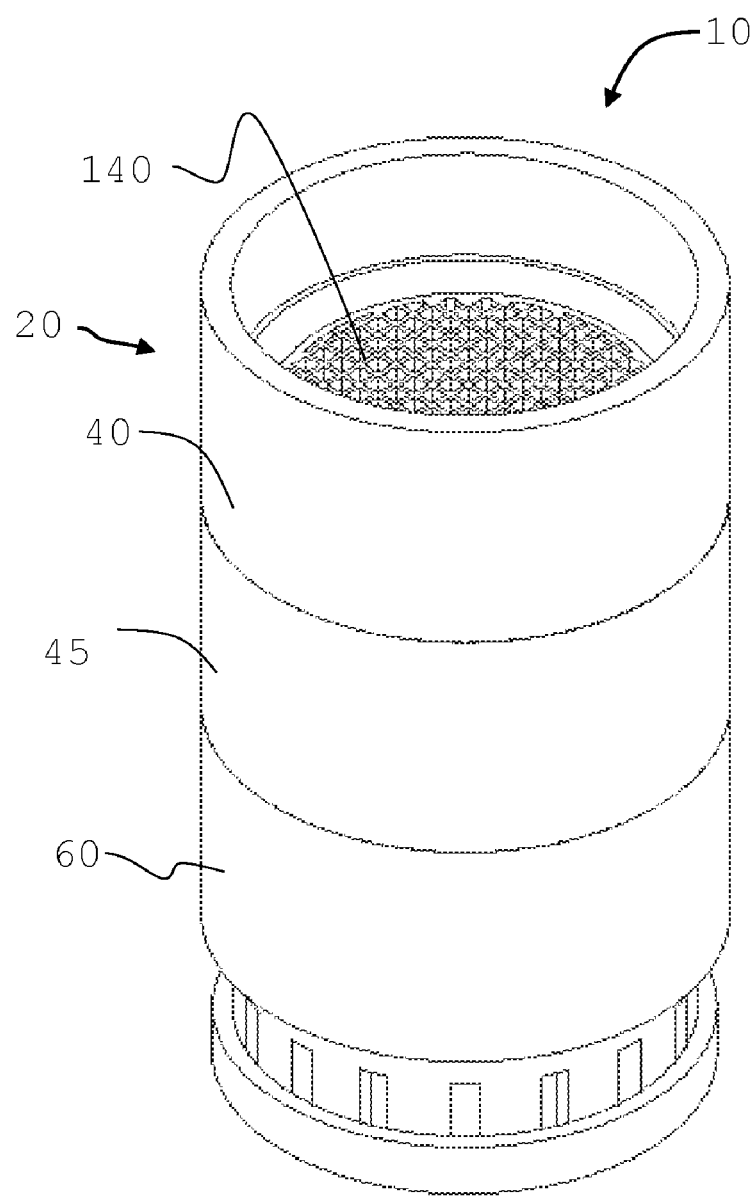
FIG. 1 is a perspective view of one of the embodiments of the invention.

Before the present invention is described in greater detail, it is to be understood that this invention is not limited to particular embodiments described, and as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Other than in the embodiment or example, or where indicated otherwise, all numbers indicating ingredient quantities and/or reaction conditions are to be understood as being modified in every instance by the word "about," which means the ingredient quantities or reaction conditions are within 10 percent to 15 percent of the indicated value.

Unless defined otherwise, all terms used herein have the same meaning as commonly understood by one of ordinary skill in the art to which this invention belongs. Although any methods and materials similar or equivalent to those described herein can be used in the practice or testing of the present invention, some potential and exemplary methods and materials may now be described. Any and all publications mentioned herein are incorporated herein by reference to disclose and describe the methods and/or materials in connection with which the publications are cited. It is understood that the present disclosure supersedes any disclosure of an incorporated publication to the extent there is a contradiction.

It must be noted that as used herein and in the appended claims, the singular forms "a", "an", and "the" may also include the plural referents unless the context clearly dictates otherwise.

It is further noted that the claims may be drafted to exclude any element that may be optional. As such, this statement is intended to serve as antecedent basis for use of such exclusive terminology as "solely", "only" and the like in connection with the recitation of claim elements, or the use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention.

Referring to FIG. 1, FIG. 2, FIG. 3, FIG. 4, and FIG. in one embodiment of the invention, the apparatus 10 to allow or stop an air flow 180, comprises (a) a housing 20 having an upper flow passage 40, a middle flow passage 45, a lower flow passage 60, wherein the upper flow passage 40 is above the middle flow passage 45, wherein the middle flow passage 45 is above the lower flow passage 60, wherein a first pressure P1 exists in the upper flow passage 40, wherein a second pressure P3 exists in the middle flow passage 45, and wherein a third pressure P2 exists in the lower flow passage 60; (b) a first valve seat 100, wherein the first valve seat 100 is between the upper flow passage 40 and the middle flow passage 45, and wherein a at least one opening 106 is formed on the first valve seat 100; (c) a first sealing member 600, wherein the first sealing member 600 is dimensioned and configured to be inside the upper flow passage 40, wherein the first sealing member 600 is configured and dimensioned to substantially cover the at least one opening 106 of the first valve seat 100, wherein the first sealing member 600 has a predetermined weight, and wherein the first sealing member 600 can move upwardly and downwardly above the first valve seat 100; (d) a second valve seat 110, wherein the second valve seat 110 is between the middle flow passage 45 and the lower flow passage 60, and wherein a at least one opening 112 is formed on the second valve seat 110; (e) a second sealing member 620, and (f) at least one locking mechanism 800 configured to limit a movement of the first sealing member 600 and/or the second sealing member 620; wherein the second sealing member 620 is dimensioned and configured to be inside the middle flow passage 45, wherein the second sealing member 620 is configured and dimensioned to substantially cover the at least one opening 112 of the second valve seat 110, wherein the first sealing member 600 moves away from the first valve seat 100 when the second pressure P2 is greater than the first pressure P1 in a predetermined pressure difference that can be in a range between about 0.05 Pa and 500 Pa, depending on the application to different enclosed environments, such as building drainage system, forced pumping system, sump pump systems; wherein the second sealing member 620 moves away from the second valve seat 110 when the third pressure P3 is greater than the second pressure P2 in a predetermined pressure difference that can be in a range between about 0.05 Pa and 500 Pa, depending on the application to different enclosed environments, such as building drainage system, forced pumping system, sump pump systems; wherein the first pressure P1 communicates with a system pressure in the piping system or enclosed system; and wherein the third pressure P3 communicates with an ambient air pressure.

Figure 2:
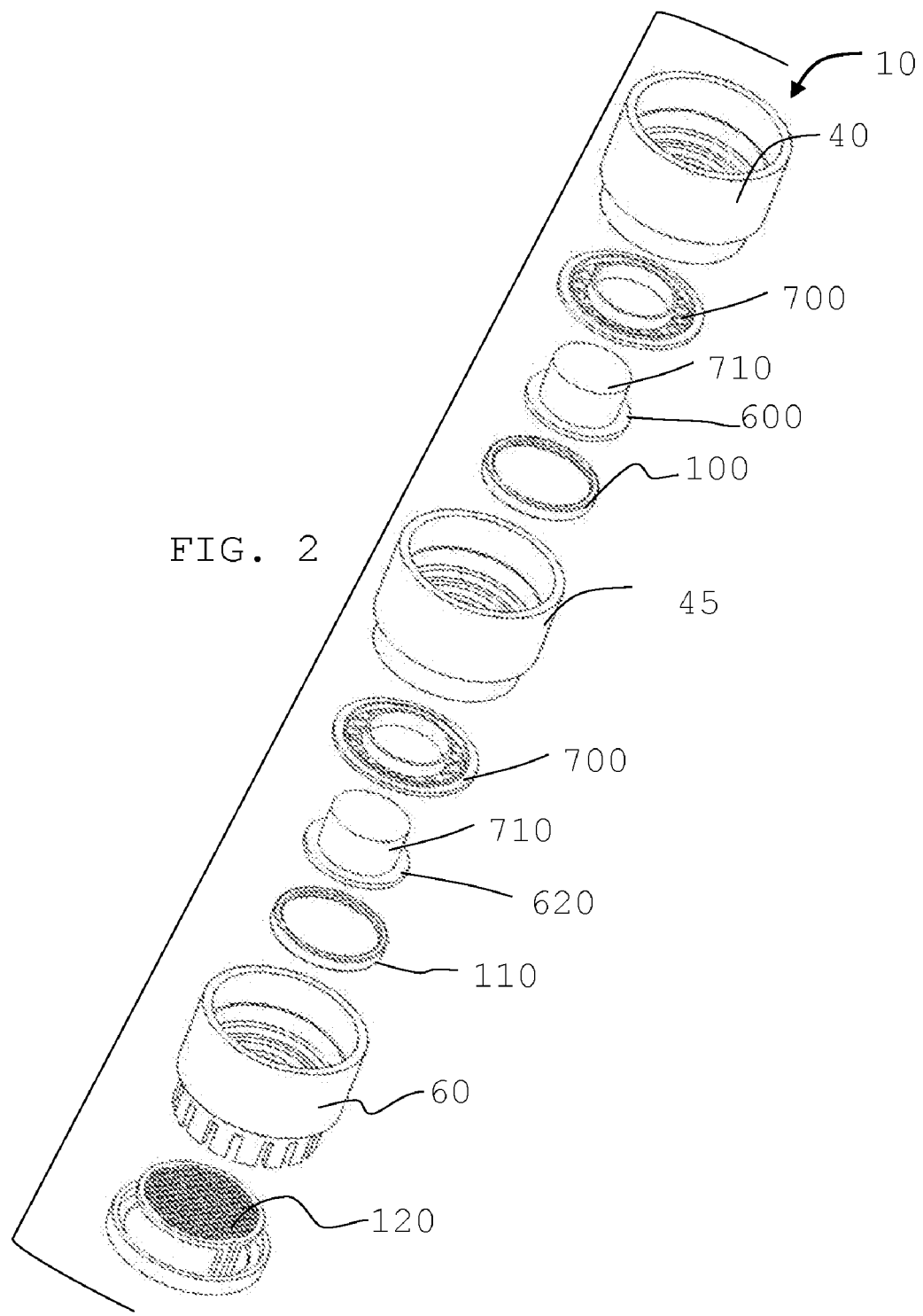
FIG. 2 is an explosive view of one of the embodiments of the invention.
Figure 3:
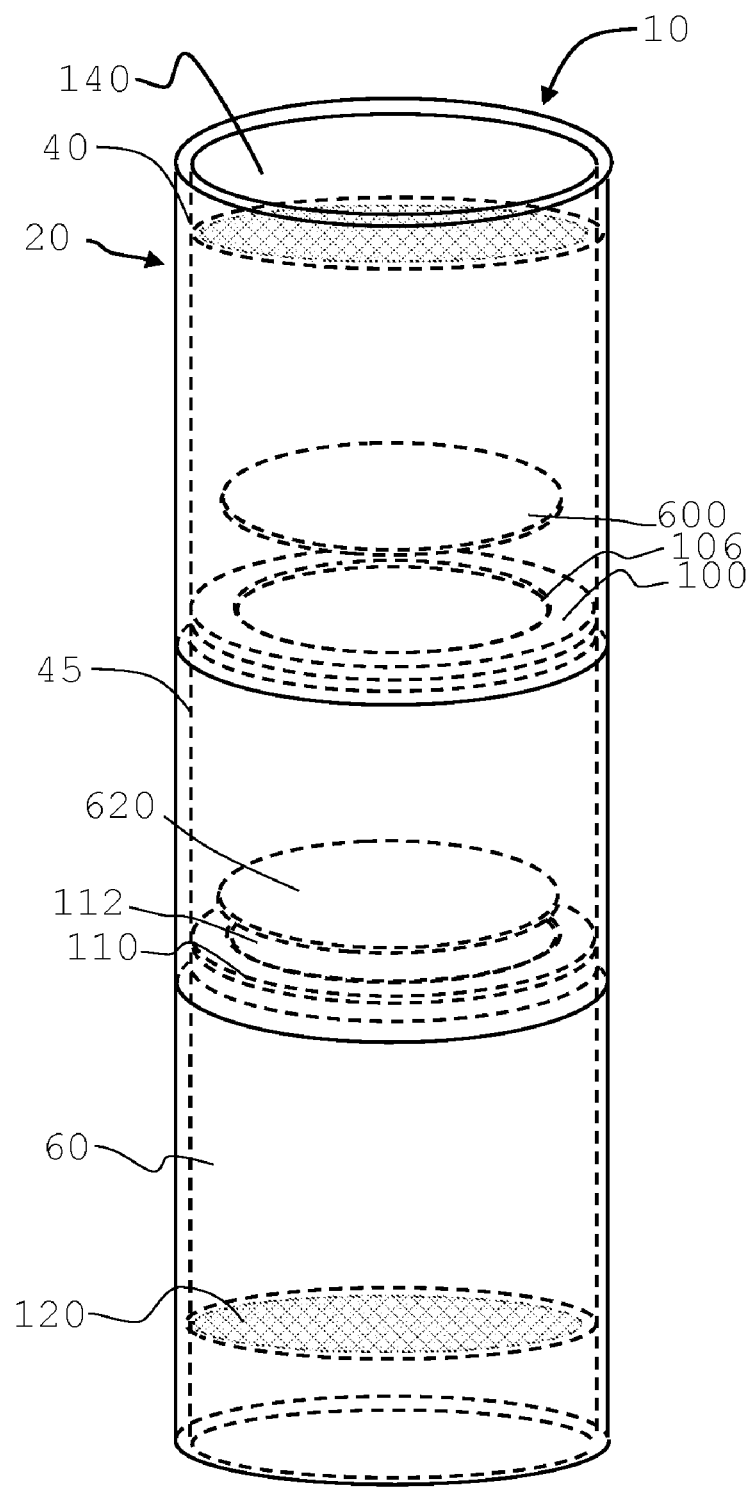
FIG. 3 is a perspective view of one of the embodiments of the invention.
Figure 4:
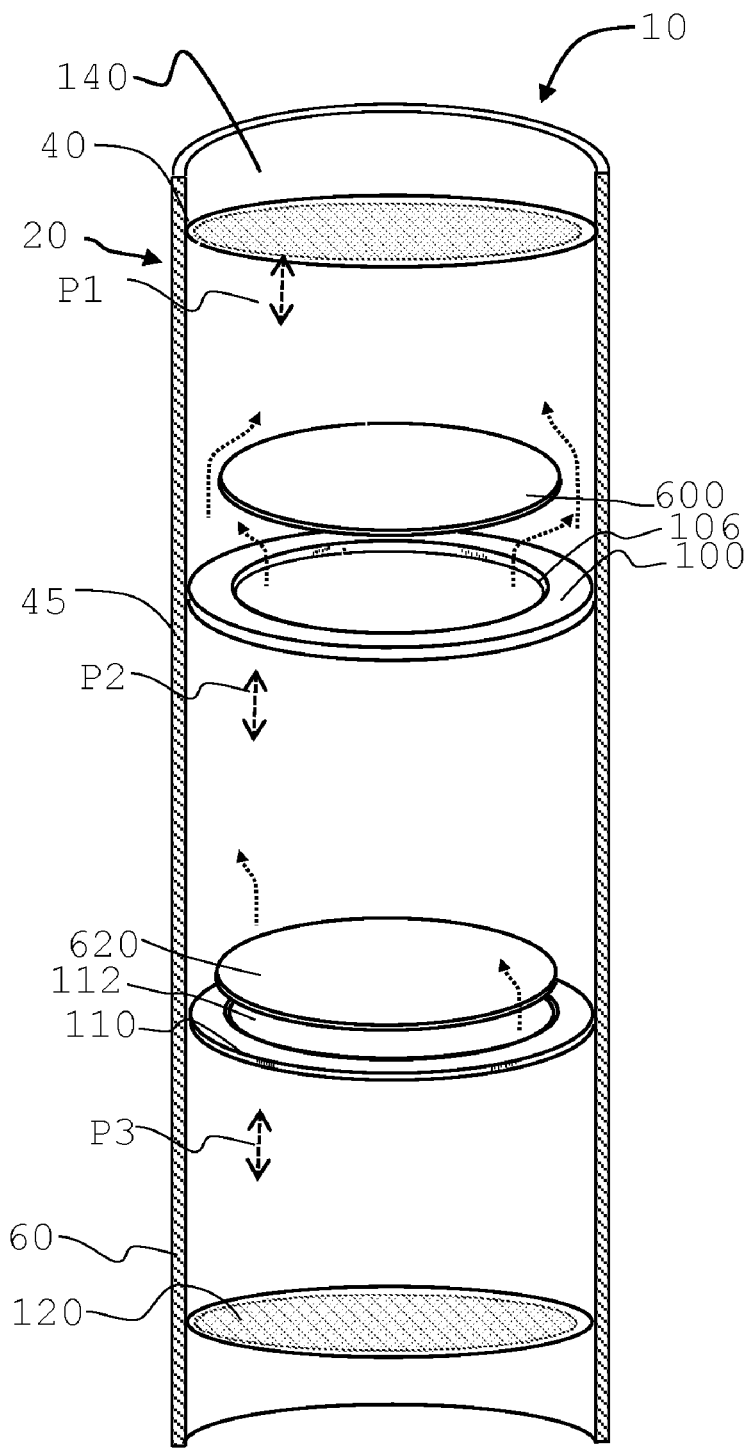
FIG. 4 is a partially sectional view of one of the embodiments of the invention.

Also referring to FIG. 1, FIG. 2, in one preferred embodiment, the first sealing member 600 and second sealing member 620 are made of material having a Shore Hardness between about 20 A and about 50 A, such as but not limited to rubber, PTFE (Fluoropolymer), EPDM (Ethylene Propylene Diene Monomer), silicon, and combination thereof. In another preferred embodiment, the first valve seat 100 and the second valve seat 110 are made of hard materials over about Shore Hardness 90A, such as but not limited to PVC (Polyvinyl chloride), metal, or HDPE (High Density Polyethylene).

Referring to FIGS. 5, 5A, 5B, 5C, and 5D, one of the embodiments, it may further comprise at least one carrier 700 connected with the first sealing member 600 and/or the second sealing member 620; at least one carrier alignment guide 710; wherein the at least one carrier 700 is disposed through the at least one carrier alignment guide 710; and wherein the at least one carrier alignment guide 710 guides the first sealing member 600 and/or the second sealing member 620 upwardly and downwardly so the sealing members can stay in the positions to cover the openings on the valve seats when it in a closed position. To provide air flow 180 to pass, a plurality of openings is formed through the at least one carrier alignment guide 710.

Also referring to FIGS. 5, 5A, 5B, 5C, and 5D, wherein the locking mechanism 800 further comprises a first end 810, a second end 830 opposed to the first end 810, a body 820 between the first end 810 and the second end 830, at least a locking mechanism opening 840 formed on the body 820, at least a lock member 850 having a first side 852 and second side 854 movably disposed in the locking mechanism opening 840, at least a pliable diaphragm 860 sealed inside the body 820, wherein the first side 852 of the lock member 850 is attached to the pliable diaphragm 860, wherein the second side 854 of the lock member 850 points away from the pliable diaphragm 860, wherein the pliable diaphragm 860 is deflectable in accordance with a pressure difference between the first pressure P1 and the second pressure P2 or between the second pressure P2 and the third pressure P3 or between the first pressure P1 and the third pressure P3, and wherein the locking mechanism 800 locks the second sealing member 620 when the locking mechanism 800 in a locked status.

Figure 5:
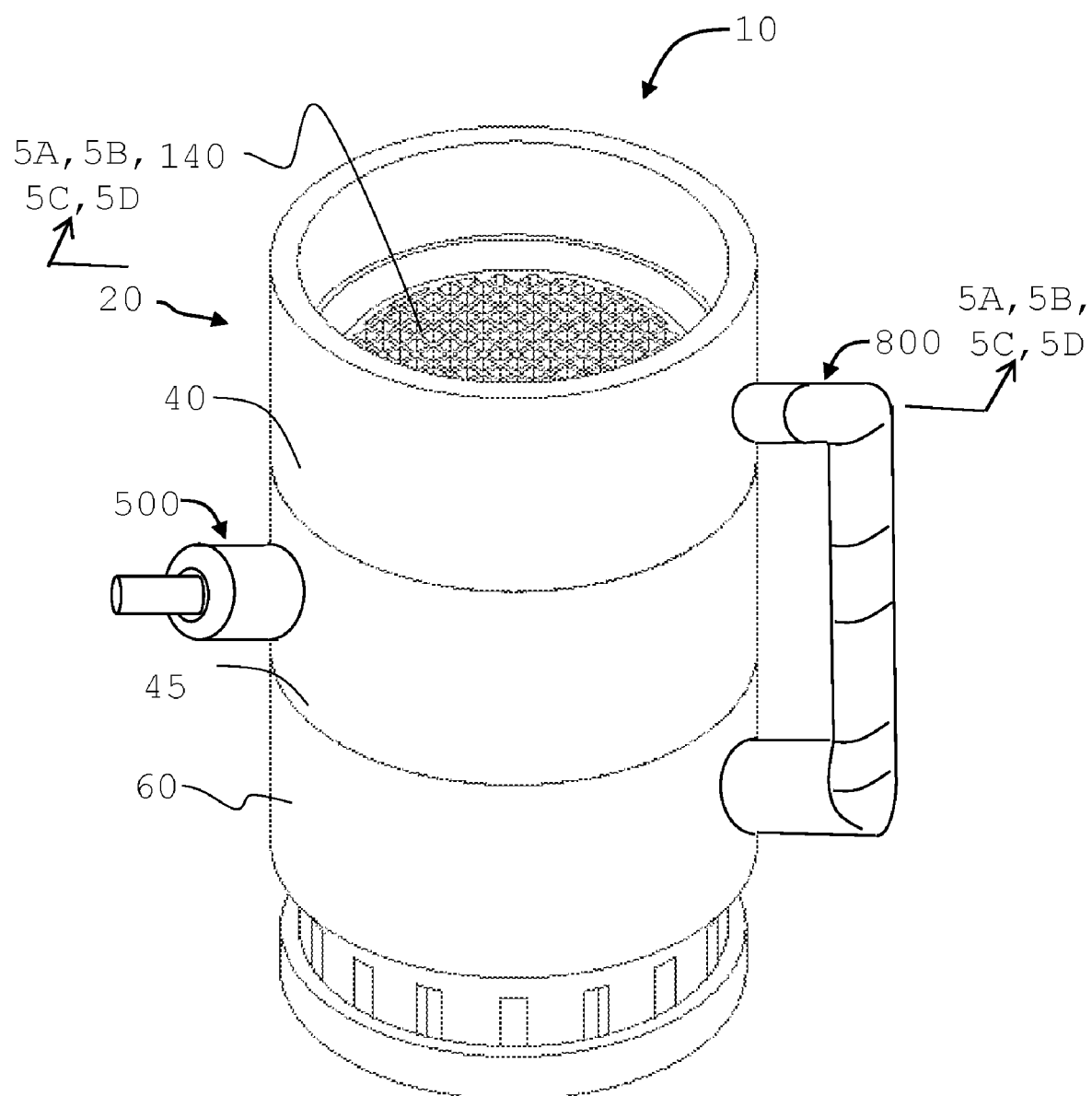
FIG. 5 is a perspective view of one of the embodiments with pressure indicator and locking mechanism.
Figure 5A:
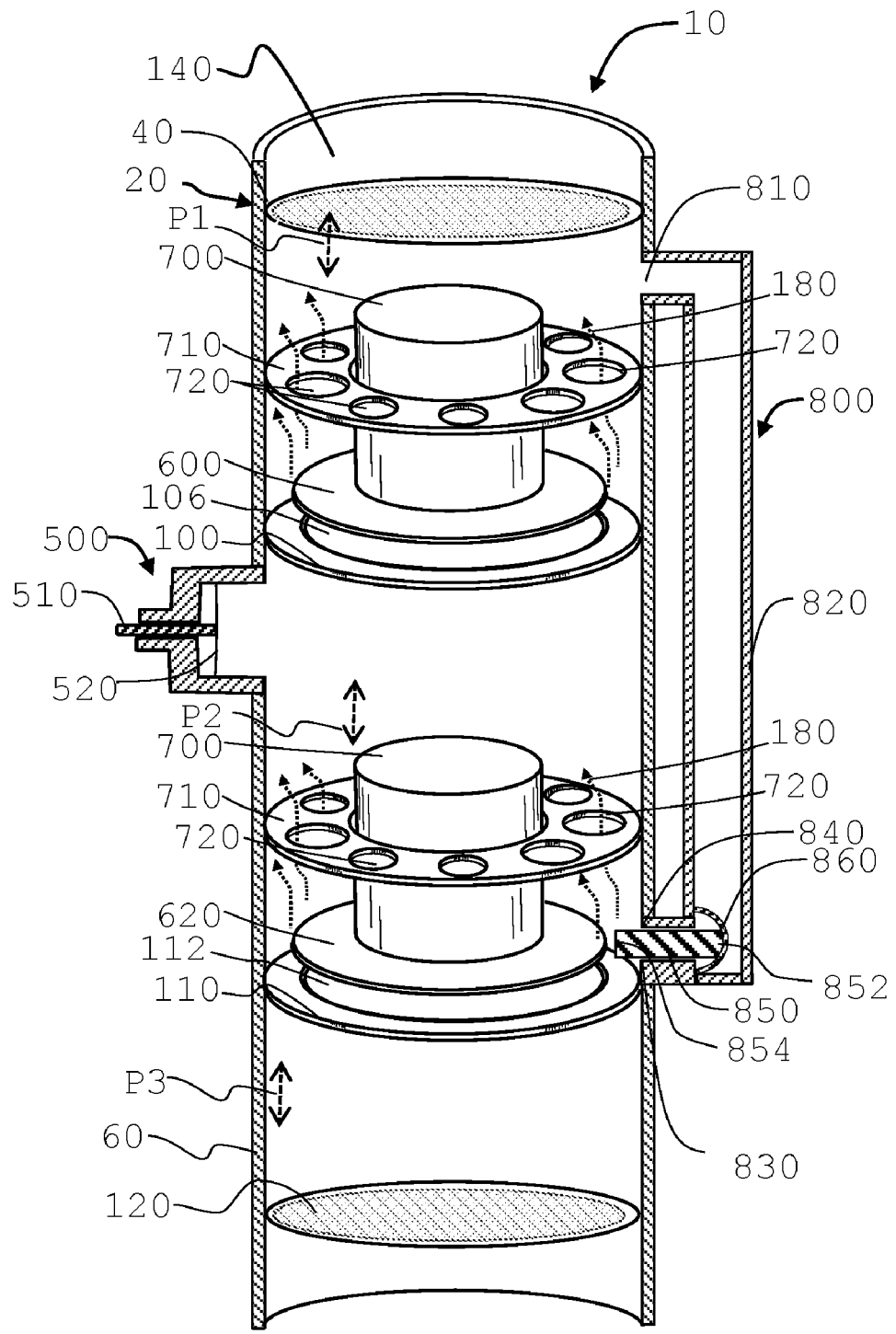
FIG. 5A is a partially sectional view of one of the embodiments with pressure indicator and locking mechanism.
Figure 5B:
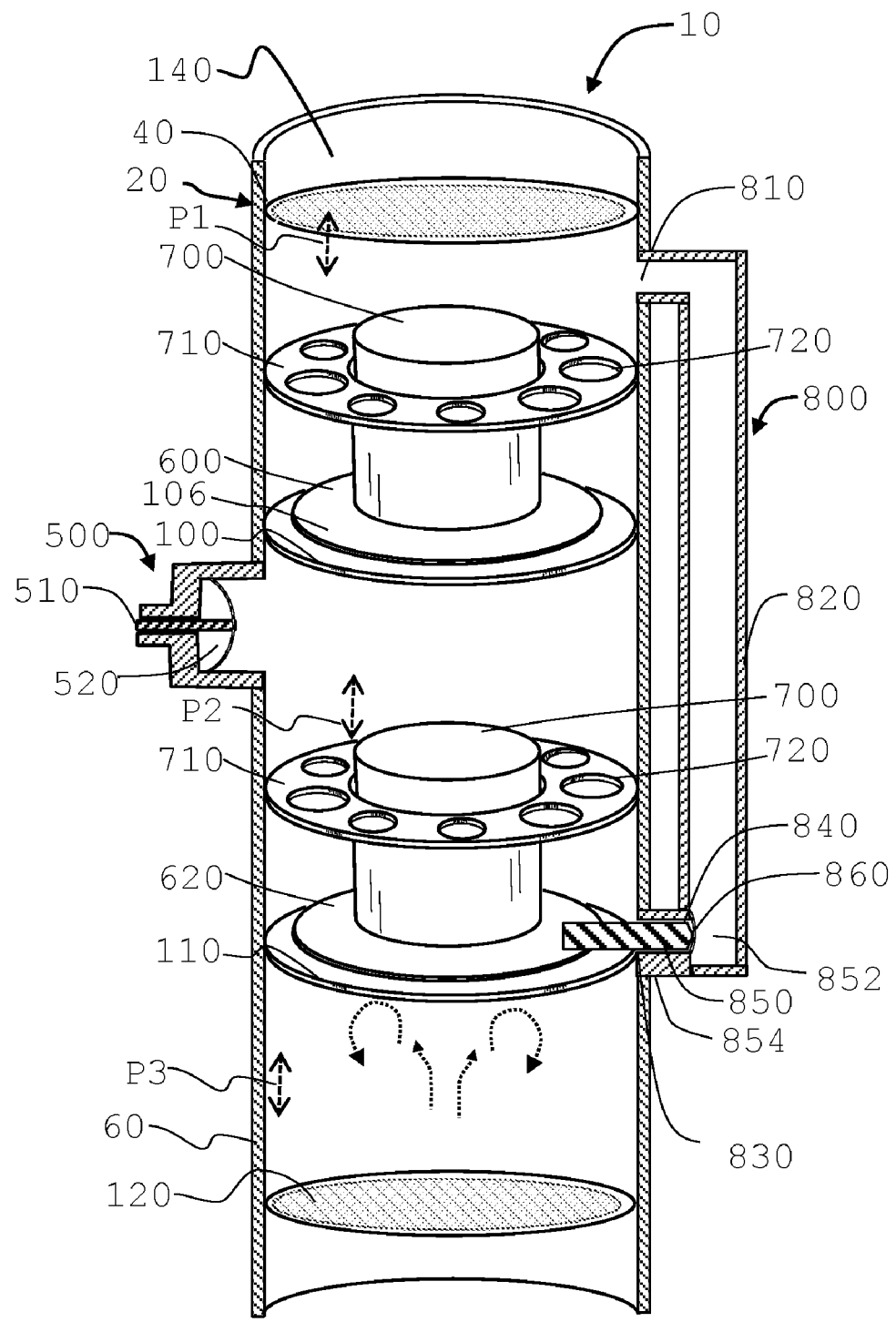
FIG. 5B is a partially sectional view of one of the embodiments with pressure indicator and locking mechanism.

Referring to FIGS. 5A and 5B, in one embodiment, wherein the first end 810 of the locking mechanism 800 is communicated with the first pressure P1; wherein the second end 830 of the locking mechanism 800 is communicated with the second pressure P2; and wherein the second side 854 of the lock member is above the second sealing member 620. As a note, the first end 810 and the second end 830 of the locking mechanism can be arranged in different combination to the communication with first pressure P1, second pressure P2, and third pressure P3, depending on the need to use the pressure difference to control the locking mechanism 800 in the following ways: (1) when the pressure in the second end 830 is greater than or equal to the pressure in the first end 810 in a pre-determined pressure difference in a range of 0.5 Pa to 500 Pa, the locking mechanism is in a unlock status that allows the sealing members 600 and/or 620 to move away from the valve seats 100 and/or 110; 2) when the pressure in the second end 830 is less than the pressure in the first end 810 in a pre-determined pressure difference in a range of 0.5 Pa to 500 Pa, the locking mechanism is in a lock status that prevents the sealing members 600 and/or 620 from moving away from the valve seats 100 and/or 110. Therefore, when the first end 810 communicates with first pressure P1, the second end 830 can be arranged to communicate with second pressure P2 or third pressure p3. The locking mechanism opening 840 can be either same as the second end 830 of the locking mechanism, or can be in a different location.

Figure 5C:
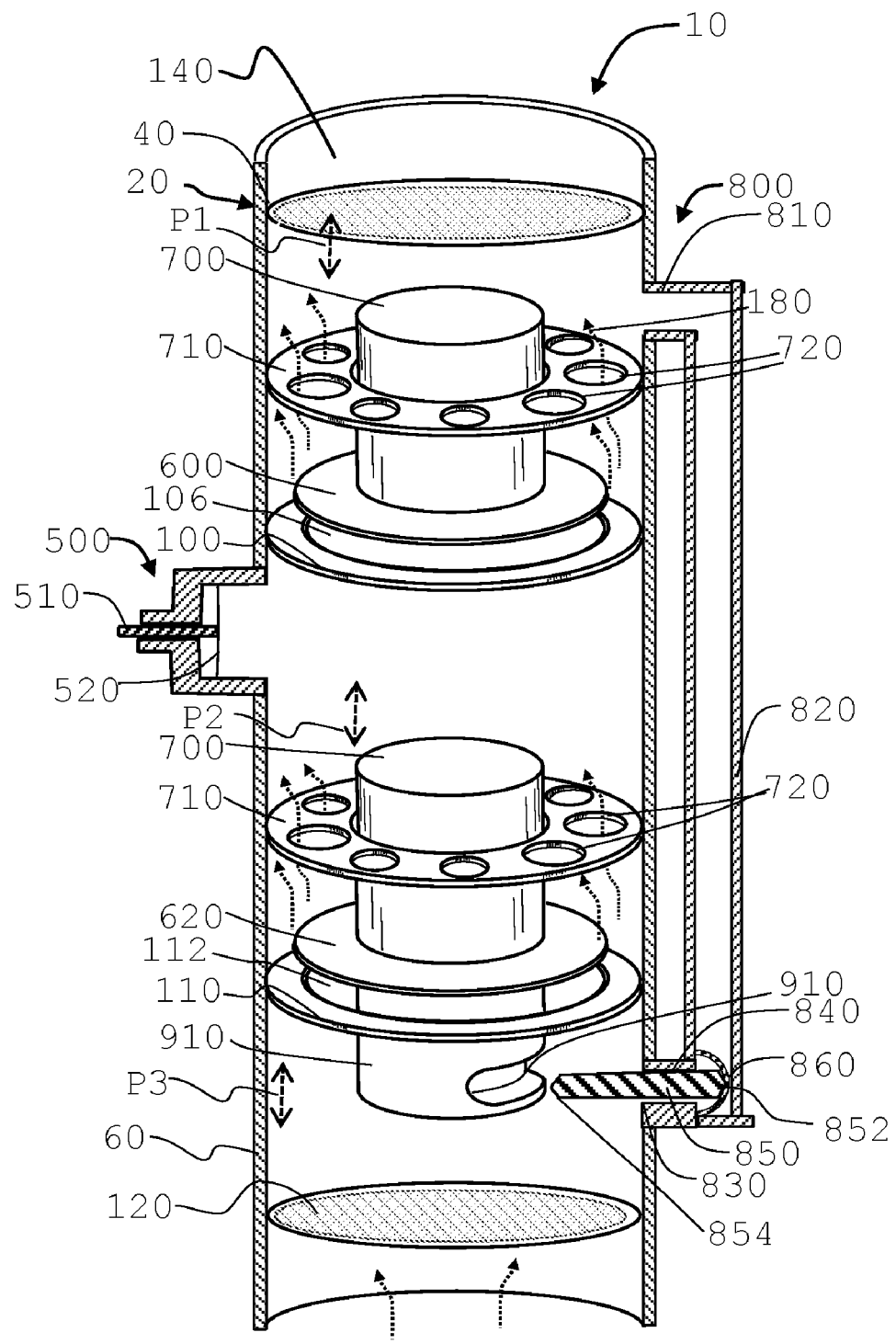
FIG. 5C is a partially sectional view of one of the embodiments with pressure indicator and locking mechanism.
Figure 5D:
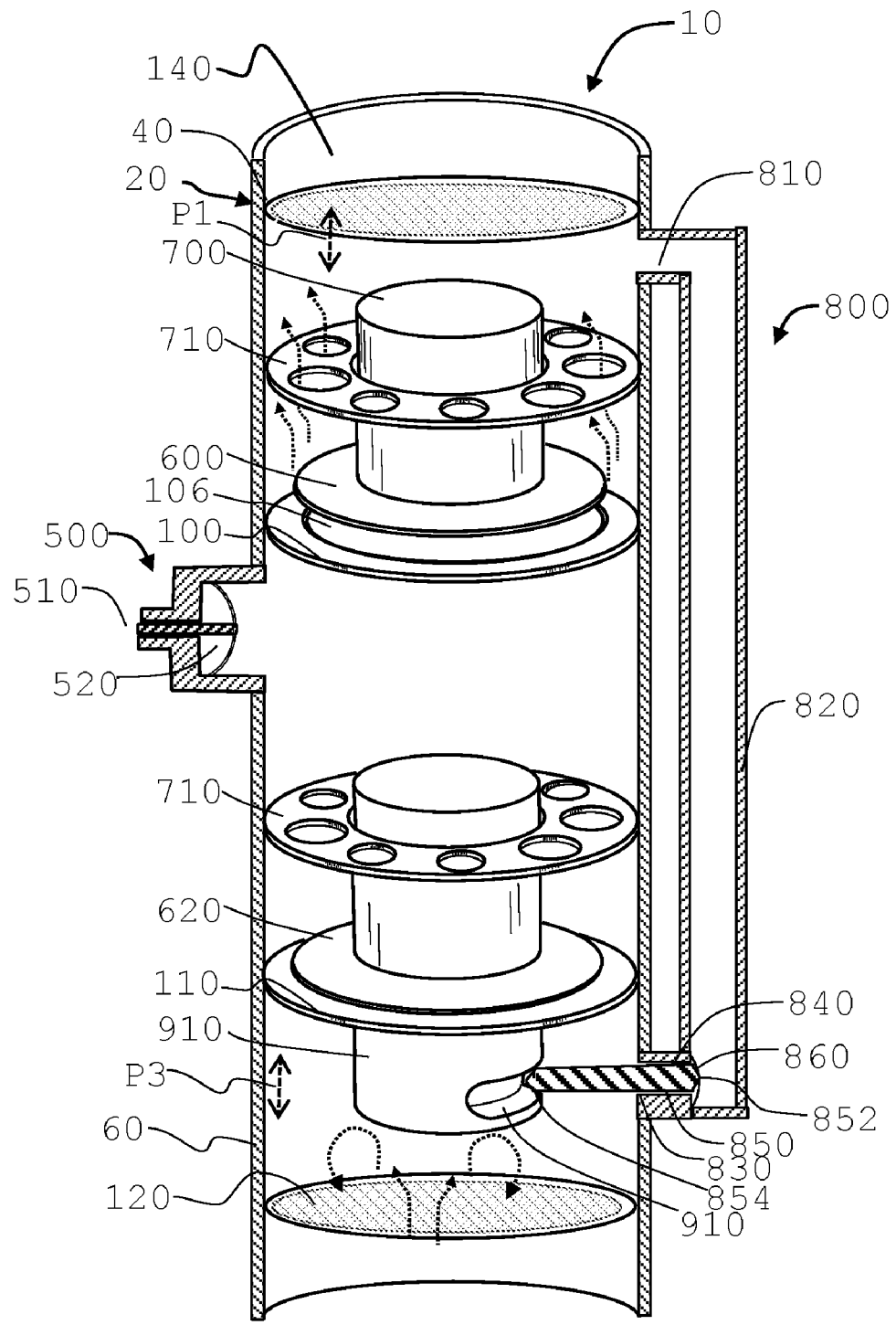
FIG. 5D is a partially sectional view of one of the embodiments with pressure indicator and locking mechanism.

Referring to FIGS. 5C and 5D, one of the embodiment also further comprises an extension 900 extended below the second sealing member 620, and a groove 910 formed on the extension 900. Also referring to FIGS. 5C and 5D, the lock member 850 is located under the second valve seat 110, wherein the first end 810 of the locking mechanism 800 is communicated with the first pressure P1; wherein the second end 830 of the locking mechanism 800 is communicated with the third pressure P3, and wherein the second side 854 of the lock member is disposed in the groove 910 when the locking mechanism 800 is in a locked status; and wherein the second side 854 of the lock member 850 is away from the groove 910 when the locking mechanism 800 is in an unlocked status.

Figure 6:
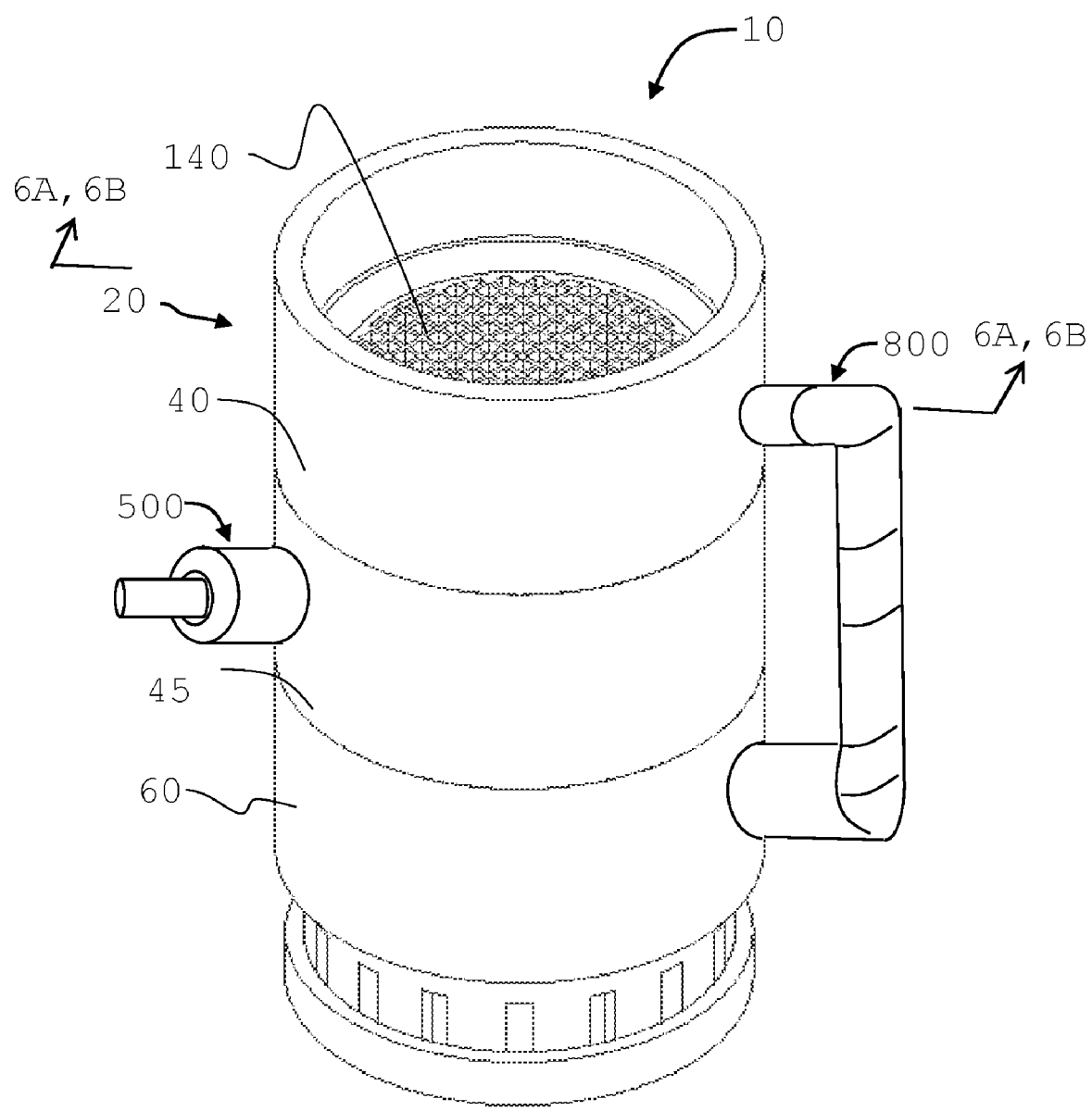
FIG. 6 is a perspective view of one of the embodiments with pressure indicator and locking mechanism.
Figure 6A:
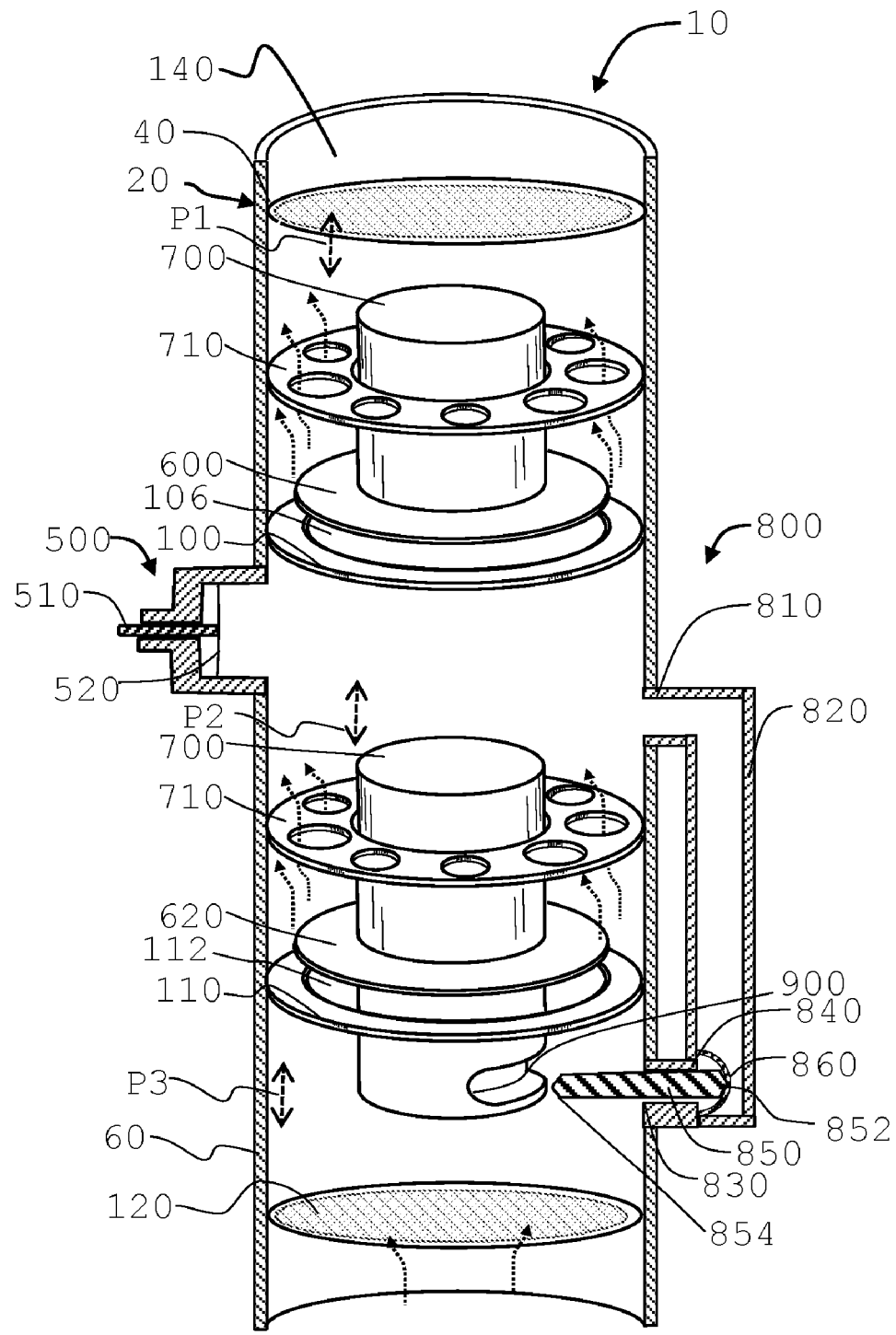
FIG. 6A is a partially sectional view of one of the embodiments with pressure indicator and locking mechanism.
Figure 6B:
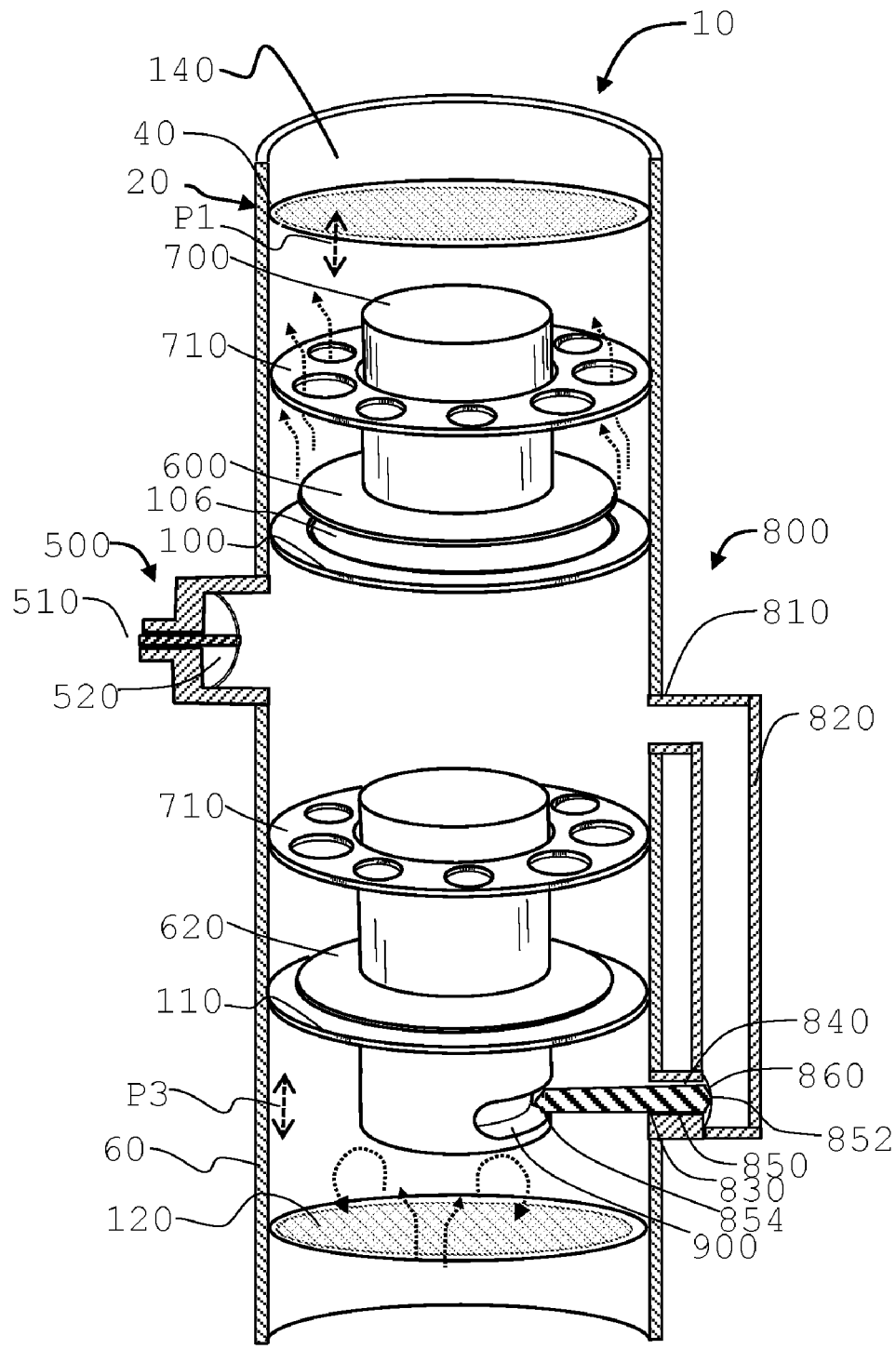
FIG. 6B is a partially sectional view of one of the embodiments with pressure indicator and locking mechanism.

Referring to FIGS. 6, 6A and 6B, one of the embodiment also further comprises an extension 900 extended below the second sealing member 620, and a groove 910 formed on the extension 900. Also referring to FIGS. 6A and 6B, the lock member 850 is located under the second valve seat 110, wherein the first end 810 of the locking mechanism 800 is communicated with the second pressure P2; wherein the second end 830 of the locking mechanism 800 is communicated with the third pressure P3, and wherein the second side 854 of the lock member 850 is disposed in the groove 910 when the locking mechanism 800 is in a locked status; and wherein the second side 854 of the lock member 850 is away from the groove 910 when the locking mechanism 800 is in an unlocked status. When the second side 854 of the lock member 850 is disposed in the groove 910, the movement of the carrier 700 and the second sealing member 620 will be limited to move to prevent air flow 180 to pass through. This lock status will happen when the pressure difference between pressure P2 and pressure P3 is greater than or equal to a predetermined value, such as in a range of 0.5 Pa to 500 Pa. This will occur when there is foul air in the enclosed system that produce a positive pressure as pressure P3 and pressure P2. The locked locking mechanism will prevent the foul air to escape to the ambient environment.

Figures 7, 7A:
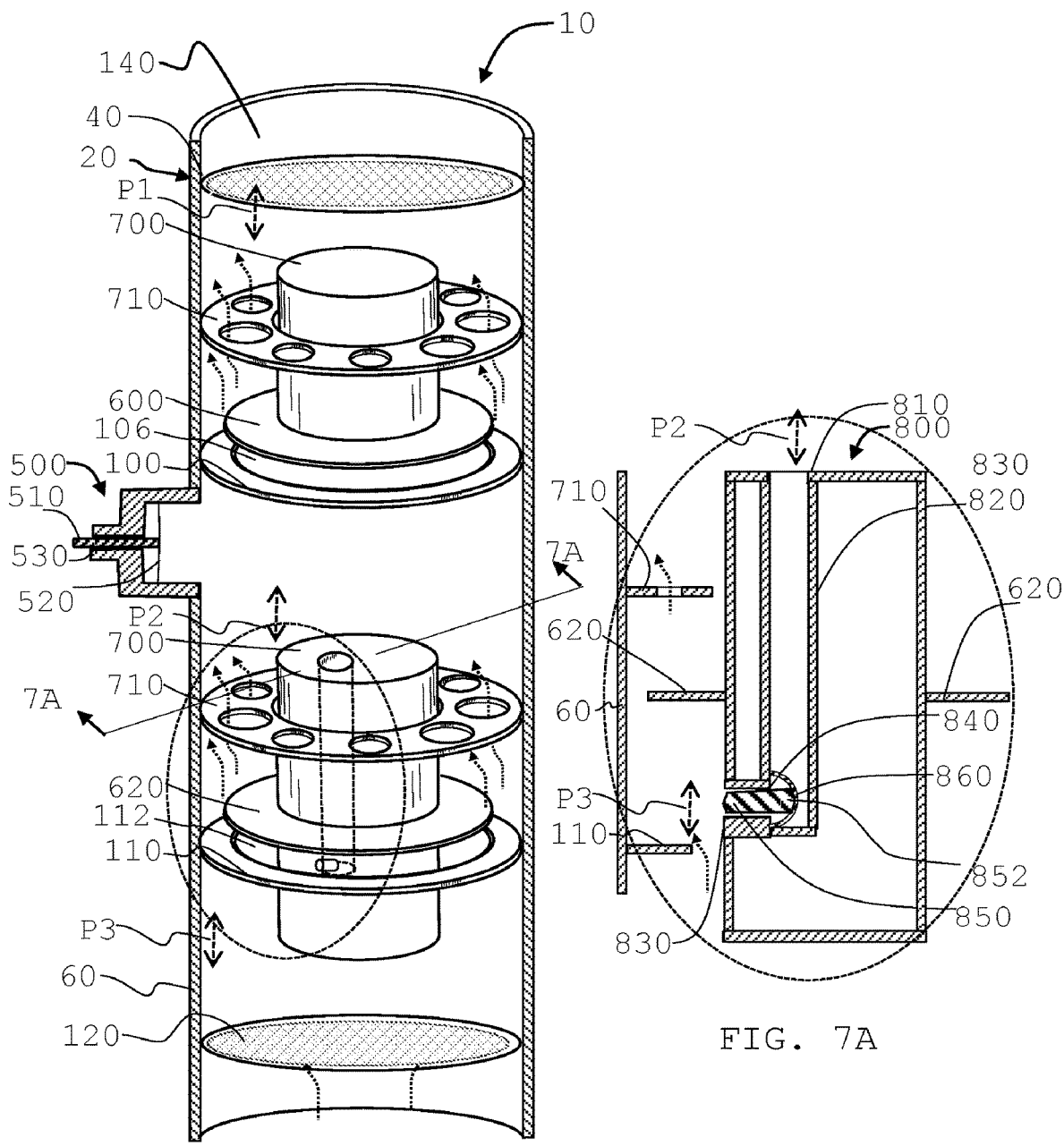
FIG. 7 is a perspective view of one of the embodiments with pressure indicator and unlocked locking mechanism in the carrier.
FIG. 7A is a partially sectional view of one of the embodiments with pressure indicator and unlocked locking mechanism in the carrier.

Now referring to FIGS. 7, 7A, and 7B, wherein the first end 810 of the locking mechanism 800 is communicated with the second pressure P2; wherein the second end 830 of the locking mechanism 800 is communicated with the third pressure p3, wherein the first side 852 of the lock member 850 is attached to the pliable diaphragm 860, wherein the second side 854 of the lock member 850 points away from the pliable diaphragm 860, wherein the locking mechanism 800 is disposed inside the extension, and wherein the second side 854 of the lock member 850 moves under the second valve seat 110 to limit the movement of the carrier 700 and the second sealing member 620 when the difference between the third pressure p3 and the second pressure P2 exceeds a predetermined value.

Also referring to FIG. 1, FIG. 2, FIG. 3, FIG. 4, FIG. 6, FIG. 7, and FIG. 8, in one embodiment, the lower flow passage filter 120 in the lower flow passage 60 and the upper flow passage filter 140 in the upper flow passage 40 prevents particles and pollutants in the air flow 180 from entering the housing 20 and prevents foreign objects, such as particles and bugs, from passing through the apparatus 10. The sieve size of the lower flow passage filter 120 and upper flow passage filter 140 can be varied with the need to filter the target particle sizes, such as the size of bugs, dust particle, or fume particle. The apparatus 10 can be connected with other pipes or conduits by any types of pipe connection, such as but not limited to fastener, treaded pipe, solvent welding, soldering, brazing, welding compression fittings, or crimped. The material of the housing 20 can be such as but not limited to plastic, copper, brass, cast iron, steel, and other commonly used in the field of art of piping.

Figure 9:
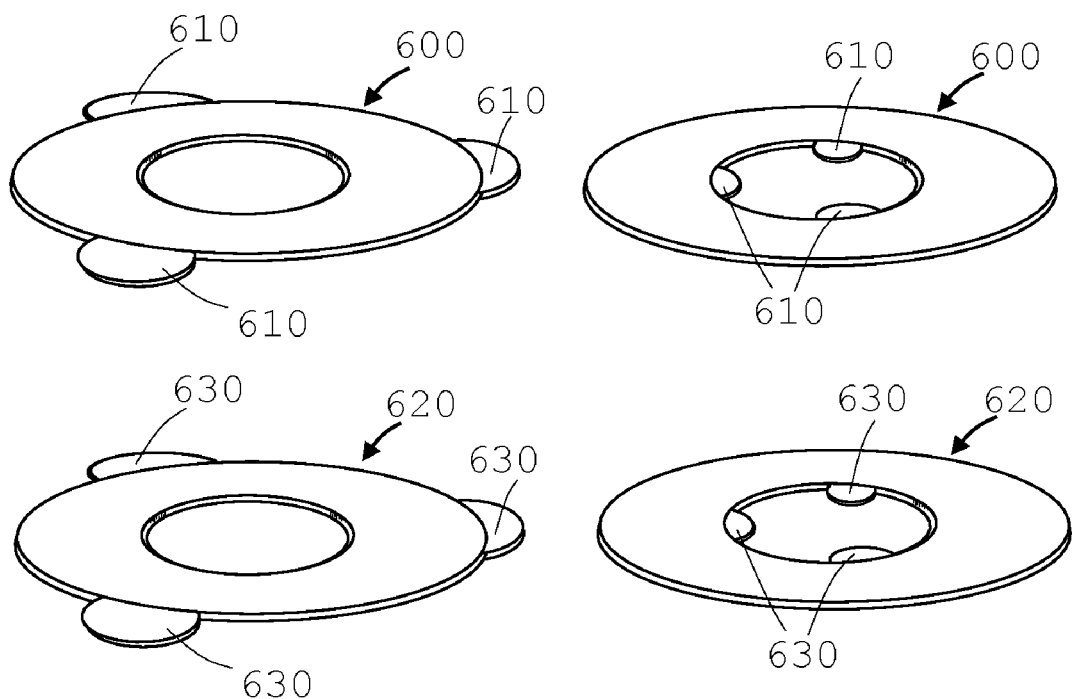
FIG. 9 is a perspective view of one of the embodiments of the invention having protruding members outside and/or outside.
Figure 10:
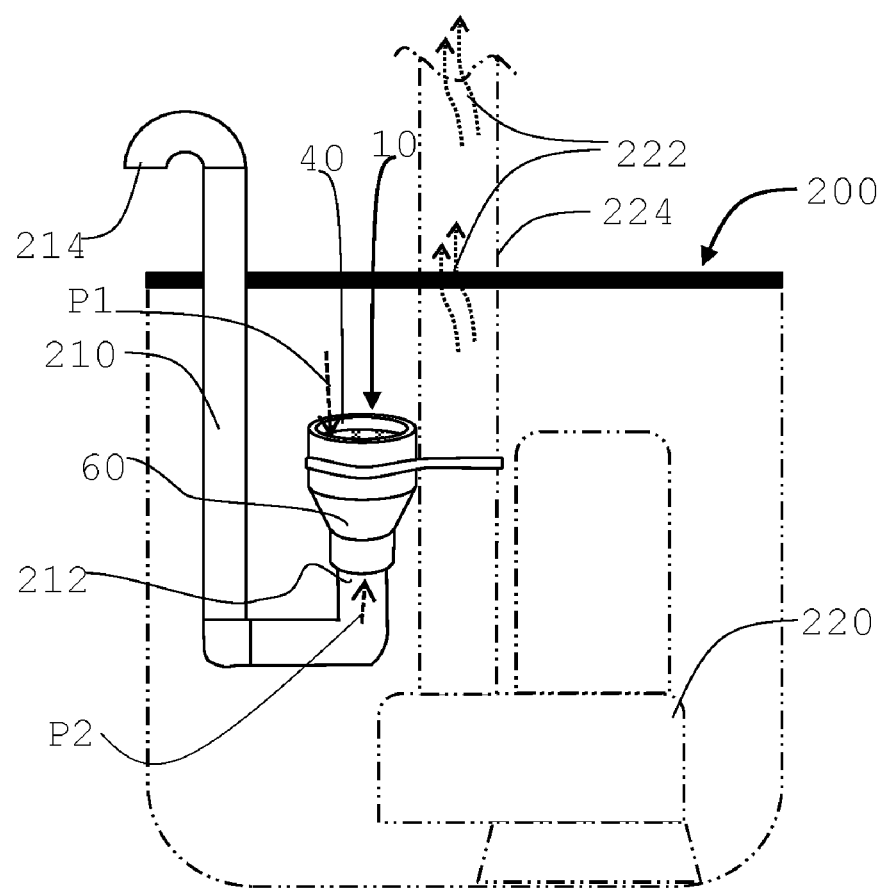
FIG. 10 is a schematic view of one of the embodiments of the invention inside an enclosed environment.

Referring to FIG. 9, the first sealing member 600 and the second sealing member 620 can have a plurality of protruding members 610 and a plurality of protruding members 630 extending radially out from the outer circumferences of first sealing member 600 and the second sealing member 620, respectively. Also referring to FIG. 9, the first sealing member 600 and the second sealing member 620 can have a plurality of protruding members 610 and a plurality of protruding members 630 extending radially out from the inner circumferences of first sealing member 600 and the second sealing member 620, respectively.

Referring to, FIGS. 1-8, and FIG. 10, in one embodiment of the apparatus 10, the apparatus 10 is inside an enclosed environment 200, wherein the enclosed environment 200 has an ambient pressure same as the first pressure P1 in the enclosed environment 200, wherein the enclosed environment 200 further comprises at least one conduit 210, wherein each of at least one conduit 210 has a first end 212 and a second end 214, wherein each of the at least one conduit 210 has the first end 212 connected to the lower flow passage 60 of the apparatus 10 and the second end 214 extends out of the enclosed environment 200, wherein the upper flow passage 40 is opened and adapted to the ambient pressure P1 of the enclosed environment 200, wherein the enclosed environment 200 has at least one pumping device 220, which conveys water and/or air 222 in the enclosed environment 200 to outside the enclosed environment 200, and wherein the at least one pumping device 220 causes a pressure difference to the apparatus 10 when the at least one pumping device 220 conveys water and/or air 222 through at least one pipe 224 out of the enclosed environment 200. The pumping of pumping device 220 will cause a vacuum, negative pressure situation, which causes the first pressure P1 in the apparatus 10 to drop, and the middle flow passage flow pressure P3 becomes greater than the first pressure P1 and the weight of the first sealing member 600. As a result, the first sealing member 600 will be lifted away from the first valve seat 100 and the first sealing member 600. If the third pressure P2 in the lower flow passage 60 becomes greater than second pressure P3, the weight of the second sealing member 620, a lifting force to lift the second sealing member 620 off the second valve seat 110 to allow air flow 180 from lower flow passage 60 to upper flow passage 40 and the enclosed environment 200 to release the negative pressure condition. In one preferred embodiment, the apparatus 10 is designed to provide air flow 180 of 12 cubic inch/Second per each millimeter of pipe 224 of the enclosed environment in which at least one pumping device 220 is located. In the enclosed environment where a pump is in operation, a second pressure P3 in the middle flow passage 45 is about 8.7 pounds per square inch (60 Kilopascal) greater than the first pressure P1 and the weight of the first sealing member 600 above the first valve seat 100, wherein the air flow 180 will flow through the housing 20 and the upper flow passage 40 when the first sealing member 600. A third pressure P2 in the lower flow passage 60 is about 8.7 pounds per square inch (60 Kilopascal) greater than the second pressure P3, the weight of the second sealing member 620 above the second valve seat 110, wherein the air flow 180 will flow through the housing 20 and the middle flow passage 45 when the first sealing member 600 is lifted. The weight of the second sealing member 620, the first sealing member 600 and the second sealing member 620 can be depended on the pressure difference that the apparatus 10 is designed to control under that situation to stop or allow the air or water passage.

Figure 11:
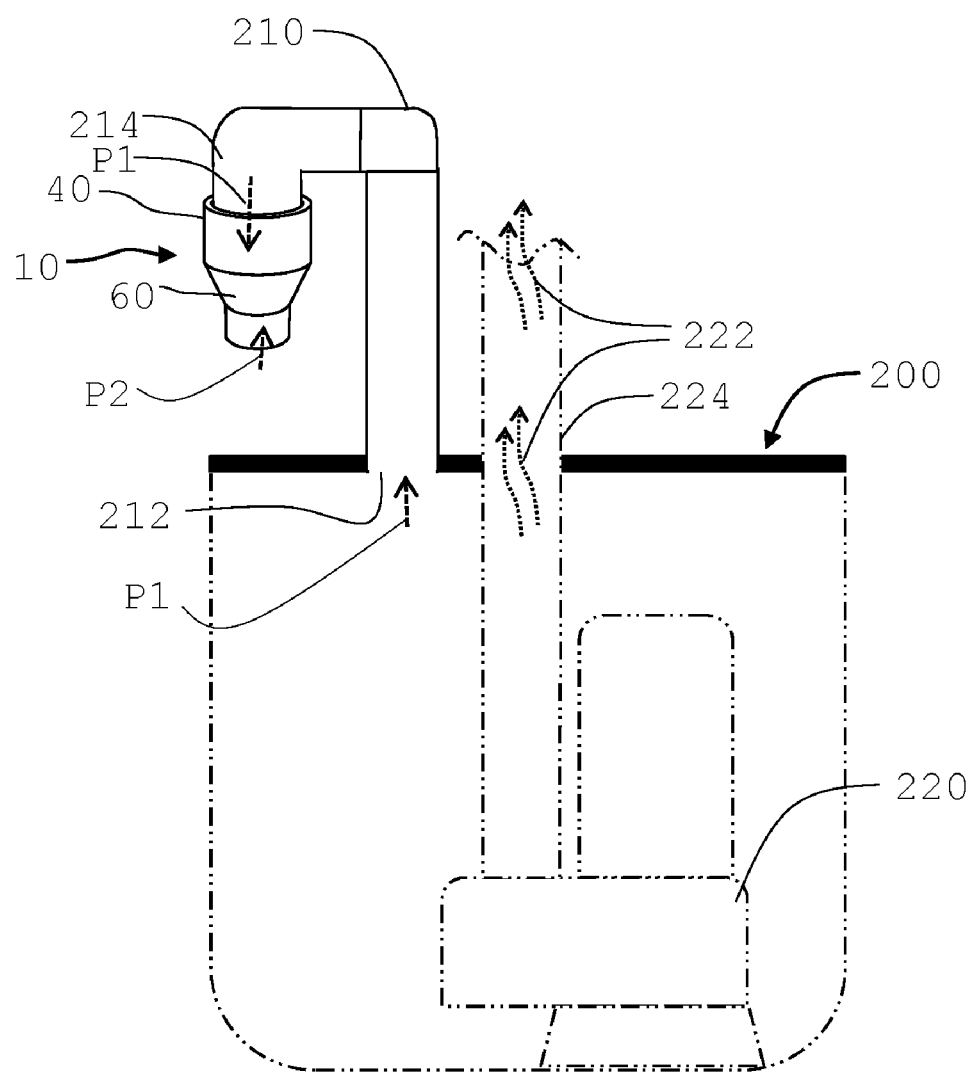
FIG. 11 is a schematic view of one of the embodiments of the invention outside an enclosed environment.
Figure 12:
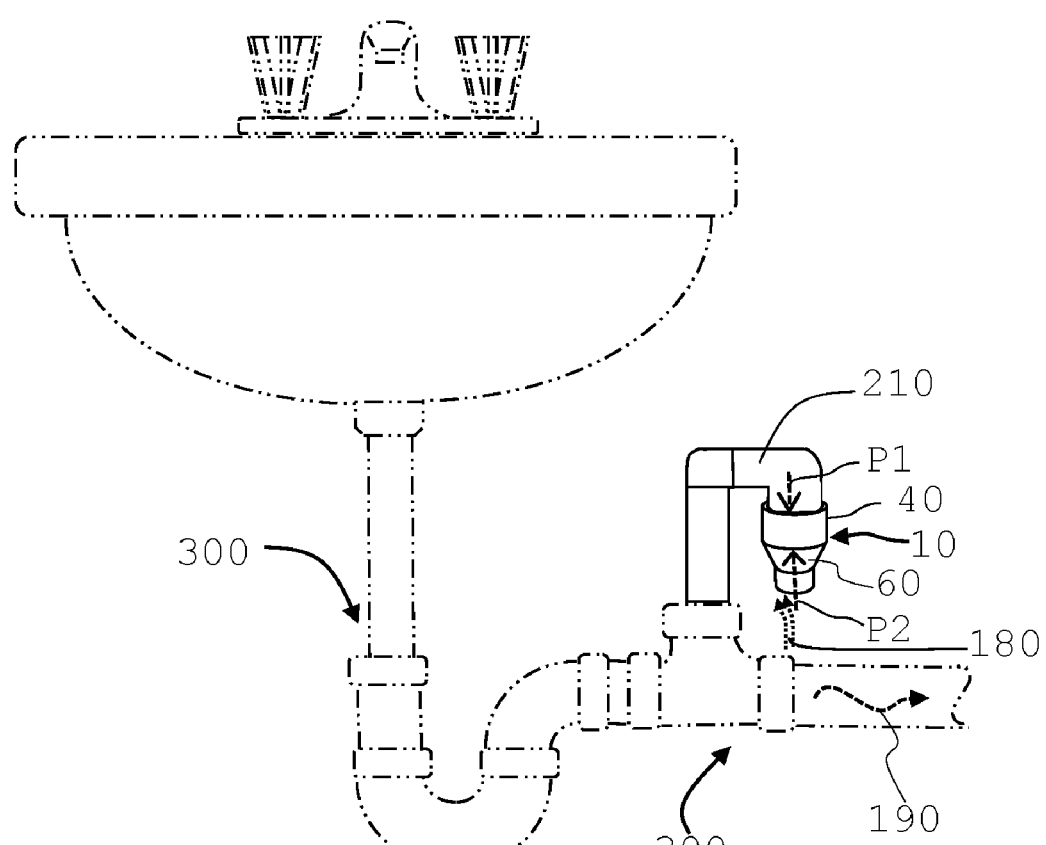
FIG. 12 is a schematic view of one of the embodiments of the invention installed in a piping system.

Referring to FIG. 11, in one embodiment of the apparatus 10, the apparatus 10 is outside an enclosed environment 200, wherein the enclosed environment 200 has an ambient pressure in the enclosed environment 200 same as the first pressure P1, wherein the enclosed environment 200 further comprises at least one conduit 210, wherein each at least one conduit 210 has a first end 212 and a second end 214, wherein each of the at least one conduit 210 has the first end 212 connected to the upper flow passage 40 of the apparatus 10 and the second end 214 extends into the enclosed environment 200, wherein the upper flow passage 40 is opened and adapted to the ambient pressure P1 of the enclosed environment 200, wherein the enclosed environment 200 has at least one pumping device 220, which conveys water and/or air 222 in the enclosed environment 200 to outside the enclosed environment 200. The pumping of pumping device 220 will cause a vacuum, negative pressure situation, which causes the first pressure P1 in the apparatus 10 to drop, and the middle flow passage flow pressure P3 becomes greater than the first pressure P1, the weight of the first sealing member 600.

Referring to FIGS. 5, 6, 5A, 5B, 5C, 5D, 6A, 6B, in one embodiment, the invention also comprises a pressure indicator 500, wherein the pressure indicator 500 is responsive to the second pressure P2, and wherein the pressure indicator 500 is visible on an external surface of the housing 20. The pressure indicator 500 comprises a pliable diaphragm 520 sealed on an opening 530 formed on the housing 20. A indicator pin 510 is attached to the pliable diaphragm 520 and is movable in the opening 530. One side communicates with pressure P2 and another side of the pliable diaphragm 520 communicate with ambient pressure. Therefore, when the pressure P2 is negative relatively to ambient pressure, the indicator pin 510 will be pull toward inside the housing so that it will not visible. When the pressure P2 is greater than the ambient pressure, the pliable diaphragm 520 will be push toward the ambient pressure side, so that indicator pin 510 will be pushed out and become visible.

What is claimed is:

1. An apparatus to allow or stop an air flow into an enclosed environment or a piping system, comprising:
   (a) a housing having an upper flow passage, a middle flow passage, a lower flow passage, wherein the upper flow passage is above the middle flow passage, wherein the middle flow passage is above the lower flow passage, wherein a first pressure exists in the upper flow passage, wherein a second pressure exists in the middle flow passage, wherein a third pressure exists in the lower flow passage;
   (b) a first valve seat, wherein the first valve seat is between the upper flow passage and the middle flow passage, and wherein a at least one opening is formed on the first valve seat;
   (c) a first sealing member, wherein the first sealing member is configured and dimensioned to substantially cover the at least one opening of the first valve seat, wherein the first sealing member can move upwardly and downwardly above the first valve seat;
   (d) a second valve seat, wherein the second valve seat is between the middle flow passage and the lower flow passage, and wherein a at least one opening is formed on the second valve seat;
   (e) a second sealing member, wherein the second sealing member is configured and dimensioned to substantially cover the at least one opening of the second valve seat, wherein the second sealing member can move upwardly and downwardly above the second valve seat;
   (f) at least one locking mechanism configured to block or allow a movement of the first sealing member or the second sealing member;
   (g) at least one carrier connected with the first sealing member; at least one carrier alignment guide; and wherein the at least one carrier is disposed through the at least one carrier alignment guide;
   wherein the first sealing member moves away from the first valve seat when the second pressure is greater than the first pressure in a predetermined pressure difference;
   wherein the second sealing member moves away from the second valve seat when the third pressure is greater than the second pressure in a predetermined pressure difference;

wherein the first pressure communicates with a system pressure in the enclosed environment or the piping system; and wherein the third pressure communicates with an ambient air pressure;
wherein a plurality of openings is formed through the at least one carrier alignment guide.

2. The apparatus of claim 1, wherein the locking mechanism further comprises a first end, a second end opposed to the first end, a body between the first end and the second end, at least a locking mechanism opening formed on the body, at least a lock member having a first side and second side movably disposed in the locking mechanism opening at least a pliable diaphragm sealed inside the body, wherein the first side of the lock member is attached to the pliable diaphragm, wherein the second side of the lock member points away from the pliable diaphragm, wherein the pliable diaphragm is deflectable in accordance with a pressure applied on the pliable diaphragm, and wherein the locking mechanism locks the second sealing member when the locking mechanism in a locked status.

3. The apparatus of claim 2, wherein the first end of the locking mechanism is communicated with the first pressure; wherein the second end of the locking mechanism is communicated with the second pressure; and wherein the second side of the lock member is above the second sealing member.

4. The apparatus of claim 2, wherein the first end of the locking mechanism is communicated with the first pressure; wherein the second end of the locking mechanism is communicated with the third pressure; and wherein the second side of the lock member is above the second sealing member.

5. The apparatus of claim 2, wherein the first end of the locking mechanism is communicated with the second pressure; wherein the second end of the locking mechanism is communicated with the third pressure; and wherein the second side of the lock member is above the second sealing member.

6. The apparatus of claim 2, wherein the first end of the locking mechanism is communicated with the first pressure; wherein the second end of the locking mechanism is communicated with the second pressure; and wherein the second side of the lock member is above the first sealing member.

7. The apparatus of claim 2, wherein the first end of the locking mechanism is communicated with the first pressure; wherein the second end of the locking mechanism is communicated with the third pressure, and wherein the second side of the lock member is above the first sealing member.

8. The apparatus of claim 2, further comprising: an extension extended below the second sealing member and a groove formed on the extension of the second sealing member.

9. The apparatus of claim 8, wherein the first end of the locking mechanism is communicated with the second pressure; wherein the second end of the locking mechanism is communicated with the third pressure; and wherein the second side of the lock member is disposed in the groove when the locking mechanism is in a locked status; and wherein the second side of the lock member is away from the groove when the locking mechanism is in an unlocked status.

10. The apparatus of claim 8, wherein the first end of the locking mechanism is communicated with the first pressure; wherein the second end of the locking mechanism is communicated with the third pressure; and wherein the second side of the lock member is disposed in the groove when the locking mechanism is in a locked status; and wherein the second side of the lock member is away from the groove when the locking mechanism is in an unlocked status.

11. The apparatus of claim 2, further comprising: an extension extended below the first sealing member and a groove formed on the extension of the first sealing members.

12. The apparatus of claim 11, wherein the first end of the locking mechanism is communicated with the first pressure; wherein the second end of the locking mechanism is communicated with the second pressure; and wherein the second side of the lock member is disposed in the groove when the locking mechanism is in a locked status; and wherein the second side of the lock member is away from the groove when the locking mechanism is in an unlocked status.

13. The apparatus of claim 11, wherein the first end of the locking mechanism is communicated with the first pressure; wherein the second end of the locking mechanism is communicated with the third pressure; wherein the second side of the lock member is disposed in the groove when the locking mechanism is in a locked status; and wherein the second side of the lock member is away from the groove when the locking mechanism is in an unlocked status.

14. The apparatus of claim 1, further comprising, an extension extended below the second sealing member wherein the locking mechanism further comprises a first end, a second end opposed to the first end, a body between the first end and the second end, at least a locking mechanism opening formed on the body, at least a lock member having a first side and second side movably disposed in the locking mechanism opening, at least a pliable diaphragm sealed inside the body, wherein the first end of the locking mechanism is communicated with the second pressure; wherein the second end of the locking mechanism is communicated with the third pressure, wherein the first side of the lock member is attached to the pliable diaphragm, wherein the second side of the lock member points away from the pliable diaphragm, wherein the locking mechanism is disposed inside the extension, and wherein the second side of the lock member moves under the second valve seat to limit the movement of the carrier and the second sealing member when the difference between the third pressure and the second pressure exceeds a predetermined value.

15. The apparatus of claim 1, further comprising, an extension extended below the first sealing member wherein the locking mechanism further comprises a first end, a second end opposed to the first end, a body between the first end and the second end, at least a locking mechanism opening formed on the body, at least a lock member having a first side and second side movably disposed in the locking mechanism opening, at least a pliable diaphragm sealed inside the body, wherein the first end of the locking mechanism is communicated with the first pressure; wherein the second end of the locking mechanism is communicated with the second pressure, wherein the first side of the lock member is attached to the pliable diaphragm, wherein the second side of the lock member points away from the pliable diaphragm, wherein the locking mechanism is disposed inside the extension and wherein the second side of the lock member moves under the first valve seat to limit the movement of the carrier and the first sealing member when the difference between the second pressure and the first pressure exceeds a predetermined value.

16. The apparatus of claim 1, further comprising a pressure indicator, wherein the pressure indicator further comprises a pliable diaphragm, an opening formed on the housing, an indicator pin disposed in the opening, wherein the indicator pin can move in the opening, wherein the indicator pin is responsive to a pressure difference applied on the pliable diaphragm.

17. The apparatus of claim 1, further comprising an upper flow passage filter located in the upper flow passage and a lower flow passage filter located in the lower flow passage, and wherein the upper flow passage filter and lower flow passage filter have a predetermined sieve size to prevent a plurality of foreign objects from entering the housing.

18. The apparatus of claim 1, wherein the first sealing member further comprises a plurality of protruding members extending radially from an outer circumference of the first sealing member.

19. The apparatus of claim 1, wherein the second sealing member further comprises a plurality of protruding members extending radially from an outer circumference of the second sealing member.

\* \* \* \* \*